United States Patent [19]

Carlgren et al.

[11] Patent Number: 4,574,363
[45] Date of Patent: Mar. 4, 1986

[54] MIXED MODE ENHANCED RESOLUTION HYPHENATION FUNCTION FOR A TEXT PROCESSING SYSTEM

[75] Inventors: Richard G. Carlgren, Gaithersburg; Martin A. Reed, Rockville; Walter S. Rosenbaum, Bethesda, all of Md.

[73] Assignee: International Business Machines Corporation, Armonk, N.Y.

[21] Appl. No.: 397,703

[22] Filed: Jul. 13, 1982

[51] Int. Cl.[4] ............... G06F 9/20; G06F 5/00; B41B 27/10
[52] U.S. Cl. .................................. 364/900
[58] Field of Search ............... 364/200, 900

[56] References Cited

U.S. PATENT DOCUMENTS

| | | | |
|---|---|---|---|
| 3,525,368 | 8/1970 | Sirota | 139/317 |
| 3,529,296 | 9/1970 | Friedman | 364/900 |
| 3,537,076 | 10/1970 | Damerau | 364/900 |
| 4,028,677 | 7/1977 | Rosenbaum | 364/200 |
| 4,087,852 | 5/1978 | Campbell et al. | 364/200 |
| 4,092,729 | 5/1978 | Rosenbaum et al. | 364/900 |
| 4,139,902 | 2/1979 | Bodin | 364/900 |
| 4,212,077 | 7/1980 | Vittorelli | 364/900 |
| 4,308,582 | 12/1981 | Berger | 364/300 |
| 4,342,085 | 7/1982 | Glickman et al. | 364/200 |
| 4,354,765 | 10/1982 | Buchanan et al. | 364/900 |
| 4,456,969 | 6/1984 | Herzik et al. | 364/900 |
| 4,491,933 | 1/1985 | Ursin et al. | 364/900 |

FOREIGN PATENT DOCUMENTS 1140730  1/1969  United Kingdom.

OTHER PUBLICATIONS

Rod Hallen, "*Super Word Processors*", Microcomputing, Jun. 1980, pp. 214–217.
Keith Carlson and Steve Haber, "*Four Word Processors for the Apple II*", Byte, Jun. 1981, pp. 176–204.

*Primary Examiner*—Gareth D. Shaw
*Assistant Examiner*—Daniel K. Dorsey
*Attorney, Agent, or Firm*—John W. Henderson, Jr.; Douglas H. Lefeve

[57] ABSTRACT

The combination of dictionary driven hyphenation, specialized algorithmic hyphenation and intelligent blank insertion provides improved right margin justification capability in a text processing system. When hyphenation is required for right margin justification, the system compares the word to be hyphenated to a prestored dictionary of words containing hyphenation points. When the word to be hyphenated matches one of the dictionary words the hyphenation points are retrieved and the word is split at the right margin. If the word to be hyphenated does not match one of the dictionary words, then a specialized list of prestored hyphenated suffixes and prestored statistical character digrams are compared to the word to determine the appropriate hyphenation points. Once the word has been split, the system searches the line for sets of predetermined words which may be separated from other words in the sentence by adding space to the line with a minimum of aesthetic distortion. Space is then added to the line until the line ending equals the right margin. The text is then printed.

10 Claims, 5 Drawing Figures

MIXED MODE ENHANCED RESOLUTION HYPHENATION FUNCTION FOR A TEXT PROCESSING SYSTEM

TECHNICAL FIELD

This invention relates to text processing and more particularly to methods for preparing text with a justified right margin.

BACKGROUND ART

With the advent of modern computer technology and in particular with its utilization for word and text processing applications, it becomes appropriate to address problems not only for text content but also aesthetic qualities of the composition. One of the prime aesthetic factors that can be addressed using a digital computer based office system is text justification. By justification it is meant that the right margin is kept flush and ragged variations in line length are eliminated.

One of the earliest approaches to this problem evolved a justified right margin by manipulating the space between words and characters such that in the event that the last word in a line does not end within the appropriate tolerance of the right margin, spaces are either added or subtracted to the left of the word to accommodate it on the original line or the word is moved onto the succeeding line of text. Whichever way the word is moved, the objective is to terminate the padding process with the last word of the line within a tolerance (or hot zone) of the right margin.

There are several different algorithms for guiding the system in adding blanks or deleting blanks to achieve justification. However, all of the algorithms to one degree or another end up creating gaps of white space in the paragraphs that are sometimes referred to as "rivers of white". This becomes most noticeable when the addition or subtraction of blanks tends to cluster words closest to the right margin and hence destroys some of the aesthetic quality originally sought by margin justification.

A second method for achieving text justification is through automatic word hyphenation. This implies that if a word cannot be accommodated on a line, the system searches for a proper syllable hyphen break and automatically divides the word between two lines. This method avoids the "rivers of white", but for non-phonetic languages such as English the selection of appropriate hyphen breaks in itself is a major problem. Because of irregularities in the English language, hyphen selection by algorithmic means is highly error prone. One prior art method of hyphen selection looks for particular character pairs or diagrams in the word. A "diagram", as defined by *Webster's Third New International Dictionary of the English Language Unabridged* (1976), is "a group of two successive letters or other symbols". If one of these diagrams is found, then the hyphen is projected for that location. To avoid or lower the likelihood of an incorrect hyphen, the word is compared to an exception dictionary before the hyphen is inserted. If the word is in the exception dictionary, then the hyphens from that dictionary are used. Otherwise, the projected hyphenation point based on the digrams algorithm is inserted. The method of hyphenation tends to be rather error prone.

A third method for achieving text justification is through use of a completely dictionary driven hyphenation method such as the Apparatus for Automatically Forming Hyphenated Words, U.S. Pat. No. 4,092,729 issued to W. S. Rosenbaum, et al. Rosenbaum, et al discloses a complete dictionary method where along with each word in the dictionary its hyphens are encoded in a very compact form. For those words in the dictionary or conjugates of them, the method supplies absolute reliability. However, words not in the dictionary cannot be hyphenated. The ability to hyphenate with the accuracy of a dictionary and not be limited to only the words encoded in the dictionary, while maintaining high reliability, has not be accomplished by any of the prior art methods.

SUMMARY OF THE INVENTION

The invention disclosed herein combines dictionary driven hyphenation with a specialized form of algorithmic hyphenation and intelligent blank insertion. In synergism, the integrated use of dictionary and algorithm yields enhanced hyphenation resolution and "fail soft" hyphenation capability for those words not in the dictionary. When a word enters the system during a justification operation it is reviewed first by the dictionary hyphenation routine to find a match in the manner described by U.S. Pat. No. 4,092,729 entitled "Apparatus for Automatically Forming Hyphenated Words" issued to W. S. Rosenbaum, et al May 30, 1978 and expressly incorporated herein by reference. If a dictionary match occurs, then the appropriate hyphens are retrieved and their potential locations within the input word, for purposes of right margin justification word splitting, are indicated. If no dictionary match occurs, then processing proceeds to the algorithmic search for hyphen breaks and these are inserted as potential hyphenation break points in the word before transmission back to the formatting routine which performs the right margin justification. If none of the candidate justification breaks falls exactly on the margin or no hyphenation points are yielded by the dictionary or algorithm, then accommodation of the subject word on the present line or word spill to the succeeding line is accomplished by intelligent blank insertion or deletion. To avoid the "rivers of white" problem, the blank insertion or deletion is performed in such a manner that logical units of the line, delineated by selected parts of speech, are moved closer to one another to add character space in the line or separated from adjoining phrases by blank space additions to lengthen the character line.

BEST MODE FOR CARRYING OUT THE INVENTION

Figure 1:
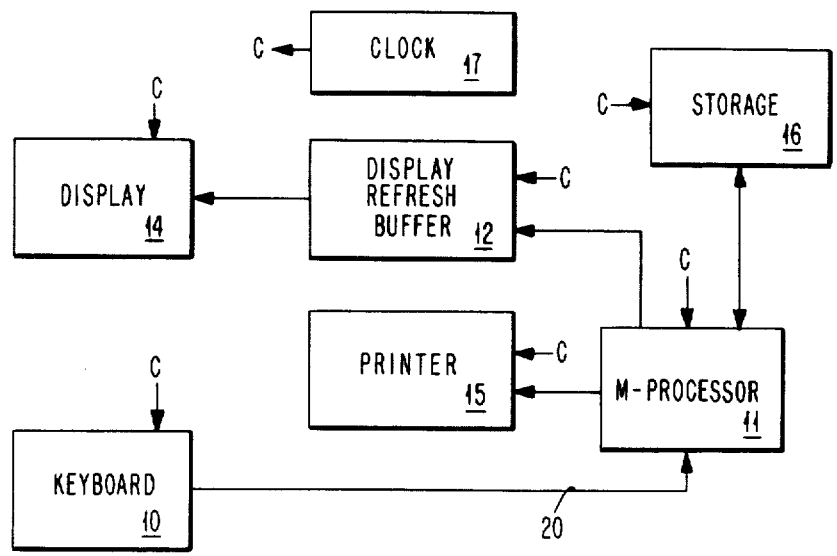
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary direct access storage device 16 such as a disk or diskette drive. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys including carriage return, tab, index, etc. In addition, the keyboard 10 includes a second set of control keys for issuing special control commands to the system. The control keys include cursor movement keys, keys for setting the keyboard 10 into a number of different modes, etc.

Figure 2:
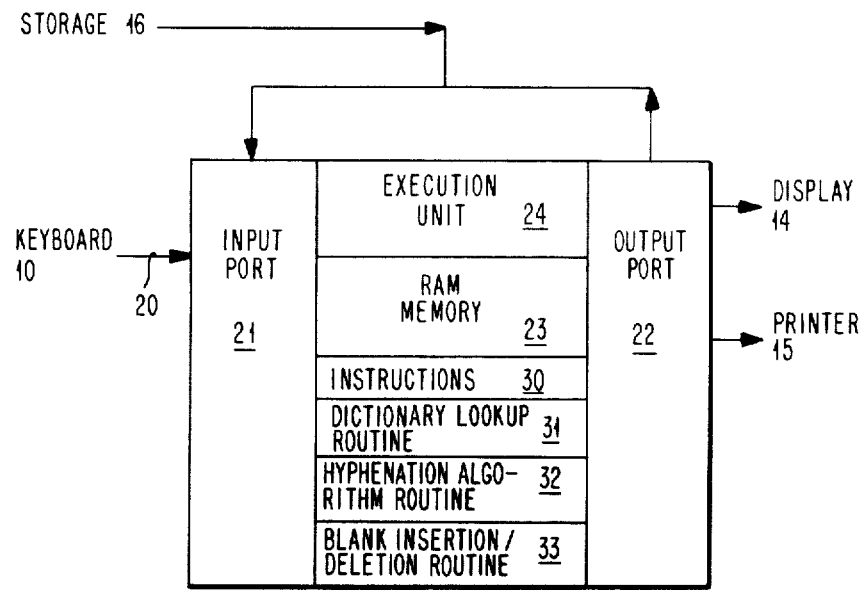
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
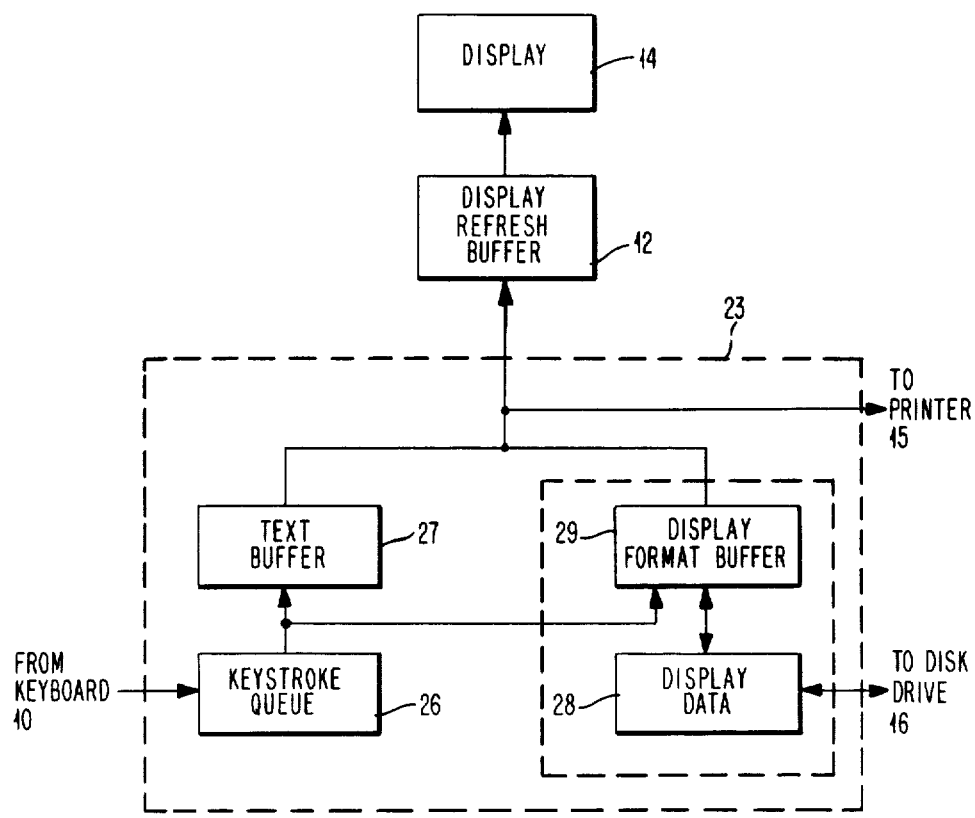
FIG. 3 is a functional diagram illustrating the data flow path between portions of the memory and the microprocessor and the display refresh buffer.

Functionally, memory unit 23 stores both instructions and data in specified sections which will be described in more detail later in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball element or a daisy-wheel print element.

Disk storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. Another section of memory 23 shown in FIG. 3 is the display format buffer area 29 which is involved in the handling of spatially related data in decoded form in accordance with the method of the present invention.

Figure 4:
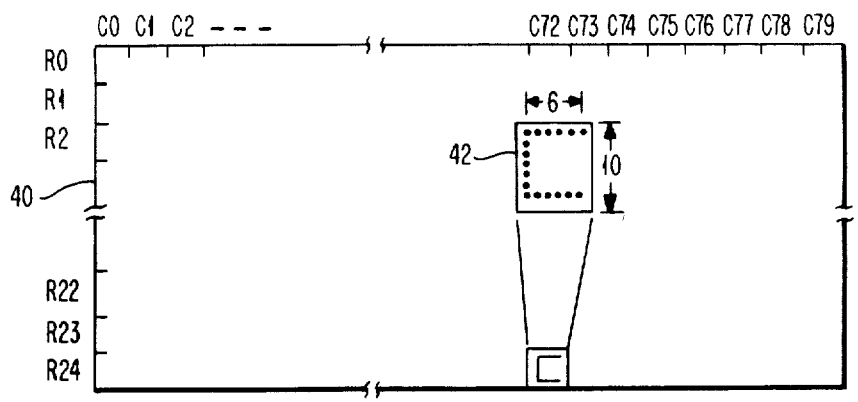
FIG. 4 is a diagrammatic view of the display shown in FIG. 1.

FIG. 4 is a schematic representation of the screen 40 of display device 14. As shown in FIG. 4, the screen 40 has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 42 in FIG. 4. The interaction of the refresh buffer 12 and the display 14 is to convert the characters stored at a location in the buffer 12 to the corresponding character as formed in a 6×10 dot matrix at the equivalent location on the display screen 40. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs and data which are also stored in memory 23 shown as memory blocks 30, 31, 32, 33 and 34 of FIG. 2 and which are called into operation in response to data from the keyboard 10 or interrupt signals generated by the various components of the system shown in FIG. 1.

Figure 5:
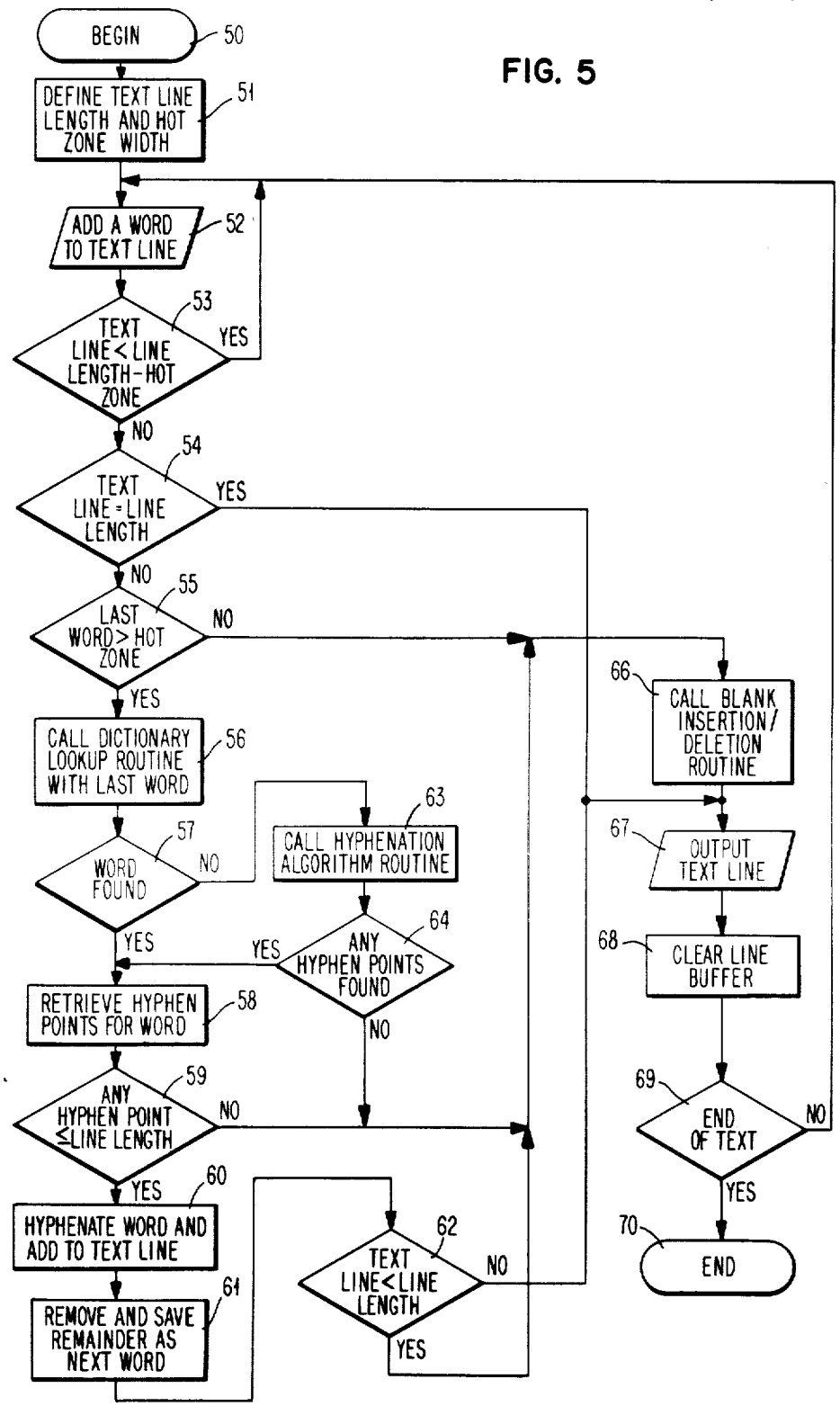
FIG. 5 illustrates the data flow of the operation of the present invention.

The preferred embodiment of the present invention comprises a set of instructions or programs for controlling a text processing system for reviewing the input text against line ending margins for display or printing and for adjusting the text within the margin boundaries for right margin justification. Input characters are received by the processor 11 in keystroke queue 26 from keyboard 10 or display data register 28 from disk 16 for formatting in text buffer 27 or display format buffer 29 prior to printing or display. The instructions in memory section 30 include conventional menus for setting formatting parameters to be used for line justification. A typical menu may include parameters to be used for line justification. A typical menu may include parameters for line length and "hot zone" width. Typically, these parameters are entered prior to inputting the text to be formatted from the keyboard 10 or disk storage device 16. Text characters and interword spaces are counted by the processor 11 under control of the instructions in memory 30. When the count of character positions in the present text line enters the "hot zone" and the number of characters in the word being added to the line of text exceeds the right side of the hot zone, the control instructions in memory 30 branch into the routines of the present invention to hyphenate the word and/or selectively enter "white space" in the line or delete "white space" from the line for justification. FIG. 5 shows a flow diagram of the operation of the justification function.

The text justification function is entered at begin block 50. In block 51 the operator is prompted to enter parameters to define the left and right margins, i.e. the text line length, and the "hot zone" width. After these menus have been satisfied, the system goes into a data entry mode if the text is to be input from the keyboard 10 or into an internal line adjust mode if the text is coming from the disk storage device 16. The line justification function operates on the text identically in either the display format buffer 29 or text buffer 27 and, therefore, the function will be described without particular regard to the text source. The input text words are added serially to the text line buffer in block 52. As each word is added to the text buffer, the text buffer is checked in block 53 to determine if the length of the text in the buffer is less than the defined line length minus the "hot zone" width. If it is, then a branch is taken back to block 52 where the next word is added to the text line. When the length of the text line as determined in block 53 is no longer less than the line length minus the "hot zone" then processing proceeds to block 54 wherein the line length is tested to determine if it is equal to the defined text line length. If it is, then processing branches to block 67 wherein the text line is output. If the text line is not equal to the defined text line length, then processing proceeds to block 55 wherein the last word that was added to the text line is tested to determine if its length is greater than the set "hot zone" width. If not, then the word must end somewhere within the "hot zone" and processing branches to block 66 to call the blank insertion/deletion routine which will be discussed later on in detail.

Assume that the last word length is greater than the defined "hot zone" width, then processing branches to block 56 wherein the dictionary lookup routine is called to test the last word. A sample program for the dictionary lookup routine is shown in Table 1 and operates in accordance with the teachings of U.S. Pat. No. 4,092,729 previously referenced.

TABLE 1

| Hyphenation Dictionary Lookup |
|---|
| BEGIN DICTIONARY-LOOKUP (INPUT-WORD, HYPHENATION-FLAG) |
| IF INPUT-WORD IS IN THE HYPHENATION DICTIONARY |
| THEN DO |
| ACCESS HYPHEN LOCATIONS FROM THE DIGITAL REFERENCE HYPHENATION MATRIX |
| INSERT HYPHENS IN THE INPUT-WORD |
| SET HYPHENATION-FLAG TO INDICATE INPUT-WORD WAS HYPHENATED |
| ENDDO |
| ELSE SET HYPHENATION-FLAG TO INDICATE INPUT-WORD NOT HYPHENATED |
| ENDIF |
| END DICTIONARY-LOOKUP (INPUT-WORD, HYPHENATION-FLAG) |

If the word is not found in the dictionary in block 57 processing branches to block 63 wherein the hyphenation algorithm routine is called. A sample program for the hyphenation algorithm routine is shown in Table 2.

TABLE 2

| Application of Pre-Hyphenated Suffix and N-Gram Hyphenation Algorithm |
|---|
| BEGIN HYPHENATION ALGORITHM (INPUT-WORD) |
| DETERMINE NUMBER OF LETTERS IN INPUT-WORD |
| IF NUMBER OF LETTERS IN INPUT-WORD IS LESS THAN 6 |
| THEN GO TO *** N-GRAM-HYPHENATION *** |
| ELSE |
| DO FOR ALL PRE-HYPHENATED ENDINGS IN TABLE 3 |
| IF INPUT-WORD ENDING MATCHES ENDING IN TABLE 3 |
| THEN |
| REPLACE INPUT-WORD ENDING WITH |

TABLE 2-continued

| Application of Pre-Hyphenated Suffix and N-Gram Hyphenation Algorithm |
|---|
| HYPHENATED ENDING |
| DROP HYPHENS LESS THAN 3 LETTERS FROM EITHER END OF WORD |
| ELSE |
| GO TO *** N-GRAM-HYPHENATION *** |
| ENDIF |
| ENDDO |
| *** N-GRAM-HYPHENATION *** |
| DO I = 3 TO ( (NUMBER OF LETTERS IN INPUT-WORD) − 3) |
| IF INPUT-WORD DIGRAM (I,I+1) MATCHES ANY DIGRAM IN TABLE 4 |
| THEN INSERT HYPHEN BETWEEN INPUT-WORD DIGRAM (I,I+1) |
| ELSE |
| ENDIF |
| ENDDO |
| ENDIF |
| END ALGORITHMIC-HYPHENATION (INPUT-WORD) |

The hyphenation algorithm routine first tests the word for a pre-hyphenated suffix stored in the memory which matches one of the suffixes shown in Table 3.

TABLE 3

| Pre-Hyphenated Suffixes for Algorithmic Hyphenation |
|---|
| "/" represents a hyphen break |
| "=" indicates the letter before the ending is repeated |

| | |
|---|---|
| (1) .../hood | (59) ...fish/ness |
| (2) .../=ance | (60) .../guish/ness |
| (3) .../=age | (61) .../quish/ness |
| (4) .../like | (62) ...r/bish/ness |
| (5) .../cia/ble | (63) ...r/mish/ness |
| (6) ...a/tia/ble | (64) ...r/nish/ness |
| (7) ...o/tia/ble | (65) ...r/vish/ness |
| (8) ...i/a/ble | (66) .../plish/ness |
| (9) ...e/a/ble | (67) ...b/lish/ness |
| (10) .../=a/ble | (68) ...ll/ish/ness |
| (11) .../ble | (69) .../=ish/ness |
| (12) .../bles | (70) .../ish/ness |
| (13) .../some | (71) .../=i/ness |
| (14) .../sive | (72) .../ful/ness |
| (15) ...e/ing | (73) .../less/ness |
| (16) ...ling | (74) ...on/ess |
| (17) .../=ing | (75) .../ness |
| (18) .../=ings | (76) .../ment |
| (19) ...fish | (77) .../=est |
| (20) .../quish | (78) .../=i/est |
| (21) .../quish | (79) .../li/est |
| (22) ...r/bish | (80) .../most |
| (23) ...r/mish | (81) .../cy |
| (24) ...r/nish | (82) .../some/ly |
| (25) ...r/vish | (83) .../sive/ly |
| (26) .../plish | (84) .../=i/ly |
| (27) ...b/lish | (85) .../ful/ly |
| (28) ...ll/ish | (86) .../less/ly |
| (29) .../=ish | (87) ...d/ly |
| (30) .../ish | (88) ...rb/ly |
| (31) ...i/eth | (89) ...glib/ly |
| (32) .../work | (90) .../bly |
| (33) ...ion/al | (91) ...ve/ly |
| (34) .../ful | (92) ...e/ing/ly |
| (35) .../dom | (93) ...ling/ly |
| (36) ...broom | (94) .../=ing/ly |
| (37) ...groom | (95) ...ing/ly |
| (38) .../room | (96) ...fish/ly |
| (39) ...s/man | (97) .../guish/ly |
| (40) .../=en | (98) .../quish/ly |
| (41) .../sion | (99) ...r/bish/ly |
| (42) .../ca/tion | (100) ...r/mish/ly |
| (43) .../za/tion | (101) ...r/nish/ly |
| (44) .../tion | (102) ...r/vish/ly |
| (45) .../man/ship | (103) .../plish/ly |
| (46) .../ship | (104) ...p/lish/ly |
| (47) .../=er | (105) ...ll/ish/ly |
| (48) .../=i/er | (106) .../=ish/ly |
| (49) ...iz/er | (107) .../ish/ly |

TABLE 3-continued

| Pre-Hyphenated Suffixes for Algorithmic Hyphenation | |
|---|---|
| (50) .../=or | (108) ...al/ly |
| (51) .../=y's | (109) ...us/ly |
| (52) .../sives | (110) .../=ery |
| (53) .../fuls | (111) ...to/ry |
| (54) .../=ers | (112) .../cia/bil/ity |
| (55) .../less | (113) ...i/a/bil/i/ty |
| (56) .../ble/ness | (114) .../bil/i/ty |
| (57) .../some/ness | (115) ...il/i/ty |
| (58) .../sive/ness | (116) ...al/i/ty |
|  | (117) .../=y |

If the word contains a suffix which matches one of these suffixes, then the word suffix is replaced by the hyphenated suffix. If the word does not match one of the hyphenated suffixes, then the word is tested for pairs of digrams as shown in Table 4 between which it has been statistically determined that hyphen points occur. The digram pairs have been grouped according to the reliability of occurrence of hyphen points between the characters. Those hyphen breks which are absolutely reliable occur first in the table and, accordingly are accessed first by the algorithm. Digrams with hyphen reliability above 90% are grouped next in the table and those above 80% reliability follow. The last section of Table 4 shows digrams which are not hyphenable. Hence, if a word contains more than one eligible hyphen break, the N-gram algorithm will encounter the break with the greatest reliability first. If the word contains two break points with the same reliability, then the one nearest the optimal line end is selected.

If the word contains one of these hyphen points or matches the pre-hyphenated suffixes or is found in the dictionary, then processing proceeds to block 58 wherein the hyphen points are retrieved for the word. If the word does not match any of the hyphen points, then processing proceeds to block 66 wherein the word is removed from the line and saved for the next line of text. If the word does match one of the sets of hyphenation tables in the hyphenation algorithm, then processing proceeds to block 58 wherein the hyphen points for the word are retrieved. In block 59, the word is again tested to determine if any of the hyphen points in the word make the text line length less than the defined line length. If not, processing proceeds to block 66 wherein the word is removed from the line and saved for the next line. If a hyphen point in the word is located which makes the text line length less than the defined line length, processing proceeds to block 60 wherein the part of the word preceding the hyphen point is added to the text line. In block 61 the remainder of the word following the hyphen point is removed and saved as the next word. In block 62, the text line length is again tested to determine if it is less than the defined line length. If the text line length is not less than the defined line length, then it must be equal to the defined line length and processing branches to block 67 to output the text line. If the test determines that the text line length is less than the defined line length then processing branches to block 66 to call the blank insertion/deletion routine.

TABLE 4

Digrams for Algorithmic Hyphenation

| | B | C | D | F | G | H | I | J | K | L | M | N | O | P | Q | R | S | T | U | V | W | Y | Z |
|---|---|---|---|---|---|---|---|---|---|---|---|---|---|---|---|---|---|---|---|---|---|---|---|
| 100% Reliable Hyphens | | | | | | | | | | | | | | | | | | | | | | | |
| | | BC | BD | BF | BG | BH | | BJ | | | BM | BN | | BP | | | BS | | | BV | BW | | |
| | | CC | CD | | | | | | | | | CN | | | CQ | | CS | | | | | | |
| | DB | DC | DD | DF | | | | DJ | DK | | DM | | | DP | DQ | | | | | DV | DW | | |
| | | | | | | EH | | | | | | | | | | | | | | | | | |
| | FB | FC | FD | | | FH | | | | | FM | FN | | FP | | | FS | | | | FW | | |
| | GB | GC | GD | GF | | | | | | | | | | GP | | | | | | | GW | | GZ |
| | HB | HC | HD | HF | HG | HH | | | | | | HN | | HP | HQ | | | | | | HW | | |
| | | | | | | IH | II | IJ | | | | | | | | | | | | | IW | | |
| | KB | KC | KD | KF | KG | KH | | KJ | | | KM | | | KP | | | | KT | | | KW | | |
| | | | | | | LH | | LJ | | | | LN | | | | LR | | | | | LW | | |
| | | MC | MD | MF | | MH | | | | ML | | | | | MQ | MR | | | | MV | MW | | |
| | NB | | | NF | | | | NJ | | NL | | | | NP | NQ | NR | | | | NV | NW | | |
| | | | | | | OH | | OJ | | | | | | | | | | | | | | | |
| | PB | PC | PD | PF | PG | | | PJ | PK | | PM | PN | | | | | | | | | PW | | |
| | | | | | | | | RJ | | | | | | | | | | | | | RW | | RZ |
| | SB | | SD | SF | SG | | | SJ | | | | | | | | SR | | | | SV | | | |
| | TB | | TD | TF | TG | | | TJ | TK | | TM | TN | | TP | | | | | | TV | | | |
| | | | | | | | | UJ | | | | | | UQ | | | | UU | | UW | | |
| | WB | WC | | WF | WG | | | | | | WM | | | WP | | | | | WU | | WW | WY | |
| | | XC | | XF | | XH | | | | | XL | XN | XO | XP | | | | | XU | | XW | | |
| | | | | YF | | YH | | | | | | | | | | | | | | | | YW | |
| | | | | | | | | | | | | | | | | | | | | ZV | | | |
| 90-99% Reliable Hyphens | | | | | | | | | | | | | | | | | | | | | | | |
| | BB | | | | | | | | | | | | | | | | | | | | | | |
| | EB | | | | | | | | | | | | | | | | | | | | | | |
| | | | | | | DH | | | | | | DN | | | | | DS | | | | | | |
| | | | | | GG | | | | | | GM | | | | | | GS | | | | | | |
| | | | | | | | | | | | HM | | | | | | HS | | | | | | |
| | | | | | | | | KI | KK | KL | | | KO | | | KR | KS | | KU | | | KY | |
| | LB | LC | | | | | | | | | | | | | | | LS | | | | | | |
| | MB | | | | | | | | | | MM | MN | | | | | MS | | | | | | |
| | | | | | | NH | | | | | | NN | | | | | NS | | | | | | |
| | | | | | | | | | | | | | | | | | | | | | | | |
| | | | | | | | | | | | | | | | OQ | | | | | | | | |
| | | | | | | | | | | | | | | PP | | | | | | | | | |
| | RB | | | | | RH | | | | | | | | RP | | RR | | | | | | | |
| | | | | | | | | | | | SM | SN | | | | | | | | | | | |
| | | | | | | | | | | | | | | | | | | TT | | | | | |
| | | | | | | | | IU | | | | | | | | | | | | UV | | | |

TABLE 4-continued

Digrams for Algorithmic Hyphenation

| | | | | | | | | | | | | | | | | | | | | | | | | | |
|---|---|---|---|---|---|---|---|---|---|---|---|---|---|---|---|---|---|---|---|---|---|---|---|---|---|
| XA | | YC | YD | | | YG | | XI YI ZI | | | | YM | | YO | | | | | XT | | | | | | ZZ |

80-89% Reliable Hyphens

| | | | | | | | | | | | | | | | | | | | | | | | | | |
|---|---|---|---|---|---|---|---|---|---|---|---|---|---|---|---|---|---|---|---|---|---|---|---|---|---|
| IA | IB | IC | | IE | | | | | | | | | | | | | | | | | | | | | |
| | | | | | EF | EG | AH | | | | | EM | | EO | | EQ | | | AT BT CT DT | | | EW | | |
| | | | | IF | | | | | | | | | | | | | | | IT | | | | | | |
| KA | | | | | | | | | | | | | | | | | LP | | | | | | | | |
| | | | ND | | | LG | | NI | | | KN | LM | | | | | | | LT | | | | | | |
| | | | | | | OG | | | | | | | | | | | | | NT | NU | | | | | |
| | | | | | | | | | | | | | | | | | | | PT | | | | | | |
| | RC | | | | | RG | | | | | | RM | RN | | | RQ | | RS | RT | RV | | | | | |
| | | | | | | | | | | | | SL | | | | SQ | | TS | | | | | | | |
| | | | WD | | | | | | | | | | | | | UO | UP | | WT | | | TW | | | |
| YA | | | | XE YE ZE | | | | | | | | | YN | | | | YR | | | | | XY | | | |

Not Hyphenable

| | | | | | | | | | | | | | | | | | | | | | | | | | |
|---|---|---|---|---|---|---|---|---|---|---|---|---|---|---|---|---|---|---|---|---|---|---|---|---|---|
| AA | AB | AC | AD | AE | AF | AG | | AI | | AK | AL | AM | AN | AO | AP | AQ | AR | AS | | AU | AV | AW | AX | AY | |
| BA | | | | BE | | | | BI | | BK | AL | CM | | BO | BP | BQ | BR | | | BU | | | BX | BY | |
| CA | CB | | | CE | CF | CG | CH | CI | CJ | CK | CL | | | CO | CP | | CR | | | CU | CV | CW | CX | CY | |
| DA | | | ED | DE | | DG | | DI | | | DL | | | DO | | | DR | | | DU | | | DX | DY | |
| EA | | EC | | EE | | | | EI | EJ | EK | EL | | EN | | EP | | ER | ES | ET | EU | EV | | EX | EY | |
| FA | | | | FE | CF | FG | | FI | FJ | FK | FL | | | FO | | FQ | FR | | FT | FU | FV | | FX | FY | |
| GA | | | | GE | | | GH | GI | GJ | GK | GL | | | GO | | GQ | GR | | GT | GU | GV | | GX | GY | |
| HA | | | | HE | | | | HI | HJ | | | | | HO | | | HR | | HT | HU | HV | | HX | HY | |
| | | | ID | | | | | | | | IL | IM | | IO | IP | IQ | IR | IS | | | IV | | IX | IY | |
| JA | JB | JC | JD | JE | JF | | JH | JI | JJ | | JL | JM | JN | JO | JP | JQ | JR | JS | JT | JU | JV | JW | JX | JY | |
| | | | | KE | | | | | | | | | | | | KQ | | | | | KV | | KX | KY | |
| LA | | | LD | LE | LF | | | LI | | LK | OL | | | LO | | LQ | | | | LU | LV | | LX | LY | |
| MA | | | | ME | | MG | | MI | MJ | MK | PL | | | MO | MP | | | | MT | MU | | | MX | MY | |
| NA | | NC | | NE | | NG | | | | NK | | | | NO | | | | | | | | | NX | NY | |
| OA | OB | OC | OD | OE | OF | | | OI | | OK | OL | OM | ON | OO | OP | OQ | OR | OS | OT | OU | OV | OW | OX | OY | |
| PA | | | | PE | | | PH | PI | | | PL | | | PO | | | PR | | | PU | PV | | PX | PY | |
| QA | QB | QC | QD | QE | QF | QG | QH | QI | QJ | | QL | QM | QN | QO | QP | QQ | QR | QS | QT | QU | QV | QW | QX | QY | |
| RA | | | RD | RE | | | | RI | | RK | | | | RO | | | | | | RU | | | RX | RY | |

TABLE 4-continued
Digrams for Algorithmic Hyphenation

| | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|
| S | SA | — | — | — | SE | — | — | SH | SI | — | SK | — | — | — | SO | SP | — | — | SS | ST | SU | — | SW | SX | SY |
| T | TA | — | TC | — | TE | — | — | TH | TI | — | — | TL | — | — | TO | — | TQ | TR | — | — | TU | — | — | TX | TY |
| U | UA | UB | UC | UD | UE | UF | UG | UH | UI | — | UK | UL | UM | UN | — | — | — | UR | US | UT | — | — | — | UX | UY |
| V | VA | VB | VC | VD | VE | VF | VG | VH | VI | VJ | VK | VL | VM | VN | VO | VP | VQ | VR | VS | VT | VU | VV | VW | VX | VY |
| W | WA | — | — | — | WE | — | — | WH | WI | WJ | WK | WL | — | WN | WO | — | — | WR | WS | — | — | WV | — | WX | — |
| X | — | XB | — | XD | — | — | — | — | — | XJ | XK | — | XM | — | — | — | XQ | XR | XS | — | — | XV | — | XX | — |
| Y | — | — | — | — | — | — | — | — | YI | YJ | YK | — | — | — | — | YP | YQ | — | YS | YT | YU | YV | — | YX | YY |
| Z | ZA | ZB | ZC | ZD | — | ZF | ZG | ZH | — | ZJ | ZK | ZL | ZM | ZN | ZO | ZP | ZQ | ZR | ZS | ZT | ZU | — | ZW | ZX | ZY |

The blank insertion/deletion routine is shown in Table 5. The blank insertion/deletion routine scans the text line for phrases similar to those shown in Table 6. Blank spaces are inserted in the line of text equally distributed before and after any of the phrases shown in Table 6 to expand the line length to equal the right margin. If the text line length exceeds the defined line length (right margin) then the blank insertion/deletion routine will remove the last word from the line, place it on the following line and expand the remainder of the line by inserting blank spaces about the phrases shown in Table 6. Alternatively the blank insertion/deletion routine could scan the text line for the phrases shown in Table 6 and uniformly delete space following any of the phrases located. The space deletion will be accumulated until the text line length equals the define line length. If the line does not contain any of the phrases of Table 6, then the default is to uniformly add or delete spaces between all words in the line. When the text line length equals the define line length then processing continues in block 67 wherein the text line is output for printing or display. In block 68 the line buffer is cleared and in block 69 a test is conducted to determine if the end of text has been reached. If the end of text has not been reached, then processing branches back to block 52 and starts adding words to accumulate the next justified line. When the end of text is reached the text line justification routine terminates at block 70.

TABLE 5
Blank Addition or Deletion Operation

```
BEGIN BLANK-INSERTION-DELETION-SCAN
(TEXT-LINE,
RIGHT-MARGIN, NEXT-TEXT-LINE)
NEXT-TEXT-LINE = BLANKS
IF LENGTH OF TEXT-LINE IS LESS THAN
RIGHT-MARGIN
THEN DO
*** LENGTHEN-LINE ***
DO FOR ALL WORD PHRASES IN TABLE 6
DO FOR ALL WORDS IN TEXT-LINE
IF TABLE 6 WORD PHRASE CAN BE FOUND IN
TEXT-LINE
THEN DO
*** BLANK INSERT ***
INSERT BLANK BEFORE TABLE 6
WORD(S) IN TEXT-LINE
IF NEW LENGTH OF TEXT-LINE
EQUALS RIGHT-MARGIN
THEN EXIT
ELSE DO
INSERT BLANK AFTER
TABLE 6 WORD(S)
IN TEXT-LINE
IF NEW LENGTH OF
TEXT-LINE EQUALS
RIGHT-MARGIN
THEN EXIT
ELSE GO TO ***
BLANK INSERT ***
ENDIF
ENDDO
ENDIF
ENDDO
ELSE GO TO *** DEFAULT LENGTHEN ***
ENDIF
ENDDO
ENDDO
ENDDO
ELSE IF LENGTH OF TEXT-LINE IS GREATER THAN
RIGHT-MARGIN
THEN DO
*** SHORTEN-LINE ***
DO UNTIL TEXT-LINE LESS THAN OR
EQUAL TO RIGHT-MARGIN
IF THERE ARE NO HYPHENS IN THE
LAST WORD IN THE TEXT-LINE
```

TABLE 5-continued
Blank Addition or Deletion Operation

```
THEN DO
ADD LAST WORD IN
TEXT-LINE TO
NEXT-TEXT-LINE
DROP LAST WORD FROM
TEXT-LINE
ENDDO
ELSE DO
ADD LAST SYLLABLE IN
TEXT-LINE TO
NEXT-TEXT-LINE
DROP LAST SYLLABLE FROM
TEXT-LINE
ENDDO
ENDDO
IF TEXT-LINE LESS THAN RIGHT-MARGIN
THEN GO TO *** LENGTHEN-LINE ***
ELSE
ENDIF
ENDDO
ELSE
ENDIF
*** DEFAULT LENGTHEN ***
DO UNTIL TEXT-LINE EQUALS RIGHT MARGIN
ADD ONE SPACE FOLLOWING EACH WORD IN
TEXT-LINE BEGINNING AT LEFT MARGIN
ENDDO
ENDIF
END BLANK-INSERT-DELETION-SCAN (TEXT-LINE,
RIGHT-MARGIN, NEXT-TEXT-LINE)
```

TABLE 6
Blank Insertion/Deletion Keywords
Add blank before, Delete blank after:

one of the
one of a
of the
of a
to the
to a
in the
in a
by the
by a
such a
after
before
during
the
a While the invention has been particularly shown and described with reference to the best mode for carrying out the invention, it will be understood by those skilled in the art, that the table of phrases, table of suffixes and table of digrams may be modified and other changes in form and detail may be made without departing from the spirit and scope of the invention.

We claim:

1. In a text processing system including at least a central processor, a keyboard, a display, a memory and a printer, an improved method for producing right margin justified text data comprising in combination the steps of:
   (a) setting a text line length;
   (b) setting a hot zone width less than said text line length;
   (c) scanning text data in said memory and concatenating strings of said text data into a text line;
   (d) comparing the length of said text line to the set text line length;

(e) inserting a hyphen into a last text string in said text line when the length of said text line exceeds said set text line length;

(f) deleting from said text line an entire portion of said last text string which follows said hyphen;

(g) scanning the text line for text strings equal to members of a set of text strings stored elsewhere in said memory;

(h) adding space to said text line preceding and following said text strings equal to said members of said stored set of text strings until said text line length equals said set line length; and (i) printing said text line, whereby said text line ends with said hyphen at an end of said set text line length as a result of the addition of space before and after text strings in said line equal to members of said set of text strings stored elsewhere in memory.

2. The improved method for producing right margin justified text data of claim 1 wherein said step of inserting a hyphen into said last text string in said text line includes comparing said last text string to a dictionary of prehyphenated text strings and inserting said hyphen into said last text string in accordance with syllable boundaries of a stored dictionary text string which equals said last text string.

3. The improved method for producing right margin justified text data of claim 1 wherein said step of inserting a hyphen into said last text string in said text line includes comparing said last text string to a dictionary of prehyphenated text strings and, when said compare fails, comparing said last text string to a dictionary of prehyphenated suffix text strings and inserting said hyphen into said last text string in accordance with syllable boundaries of the suffix text string which equals a set of ending characters of said last text string.

4. The improved method for producing right margin justified text of claim 2 or claim 3 wherein said step of inserting a hyphen into said last text string in said text line includes scanning said last text string for pairs of prestored character diagrams and inserting said hyphen into said last text string between pairs of characters which compare equal to sets of said prestored character digrams.

5. The improved method for producing right margin justified text of claim 4 wherein said prestored character digrams are arranged in storage in accordance with a statistical reliability of syllable boundaries occurring between the characters of said digrams.

6. An improved text processing system for producing right margin justified text data comprising:

a memory for storing data;

a printer for printing data;

a keyboard for generating data; and processor means connected to said memory, said printer and said keyboard for setting a text line length, entered at said keyboard, and a hot zone width less than said text line length, entered at said keyboard, into said memory, scanning text data in said memory and concatenating strings of said text data into a text line in said memory, comparing the length of said text line to the set text line length, inserting a hyphen into a last text string in said text line when the length of said text line exceeds said set text line length, deleting from said text line an entire portion of said text string which follows said hyphen, scanning the text line for text strings equal to members of a first set of text strings stored elsewhere in said memory, adding space to said text line preceding and following said text string equal to said members of said first set of text strings until said text line equals said set line length, and outputting said text line to said printer, whereby said text line ends with a hyphen at an end of said set text line length as a result of the addition of space before and after text strings in said line equal to members of said first set of text strings stored elsewhere in said memory.

7. The improved text processing system of claim 6 wherein said processor means for inserting a hyphen into said last text string in said text line includes means for comparing said last text string to a dictionary of prehyphenated text strings stored in said memory and inserting said hyphen into said last text string in accordance with syllable boundaries of a dictionary text string stored in said memory which equals said last text string.

8. The improved text processing system of claim 6 wherein said processor means for inserting a hyphen into said last text string in said text line includes means for comparing said last text string to a dictionary of prehyphenated text strings stored in said memory and, when said compare fails, for comparing said last text string to a dictionary of prehyphenated suffix text strings stored in said memory and inserting said hyphen into said last text string in accordance with syllable boundaries of the suffix text which equals a set of ending characters of said last text string.

9. The improved text processing system of claim 6 or claim 8 wherein said processor means for inserting a hyphen into said last text string in said text line includes means for scanning said last text string for pairs of characters which compare equal to pairs of character digrams separately stored in said memory and means for inserting said hyphen into said last text string between pairs of characters in said last text string which compare equal to said character digrams separately stored in said memory.

10. The improved text processing system of claim 9 wherein said character digrams separately stored in said memory are stored in accordance with a statistical reliability of syllable boundaries occurring between characters of said digrams.

* * * * *